No. 756,244. PATENTED APR. 5, 1904.
L. LARSON.
GLASS BOTTOM BOAT.
APPLICATION FILED MAY 18, 1903.
NO MODEL. 2 SHEETS—SHEET 1.
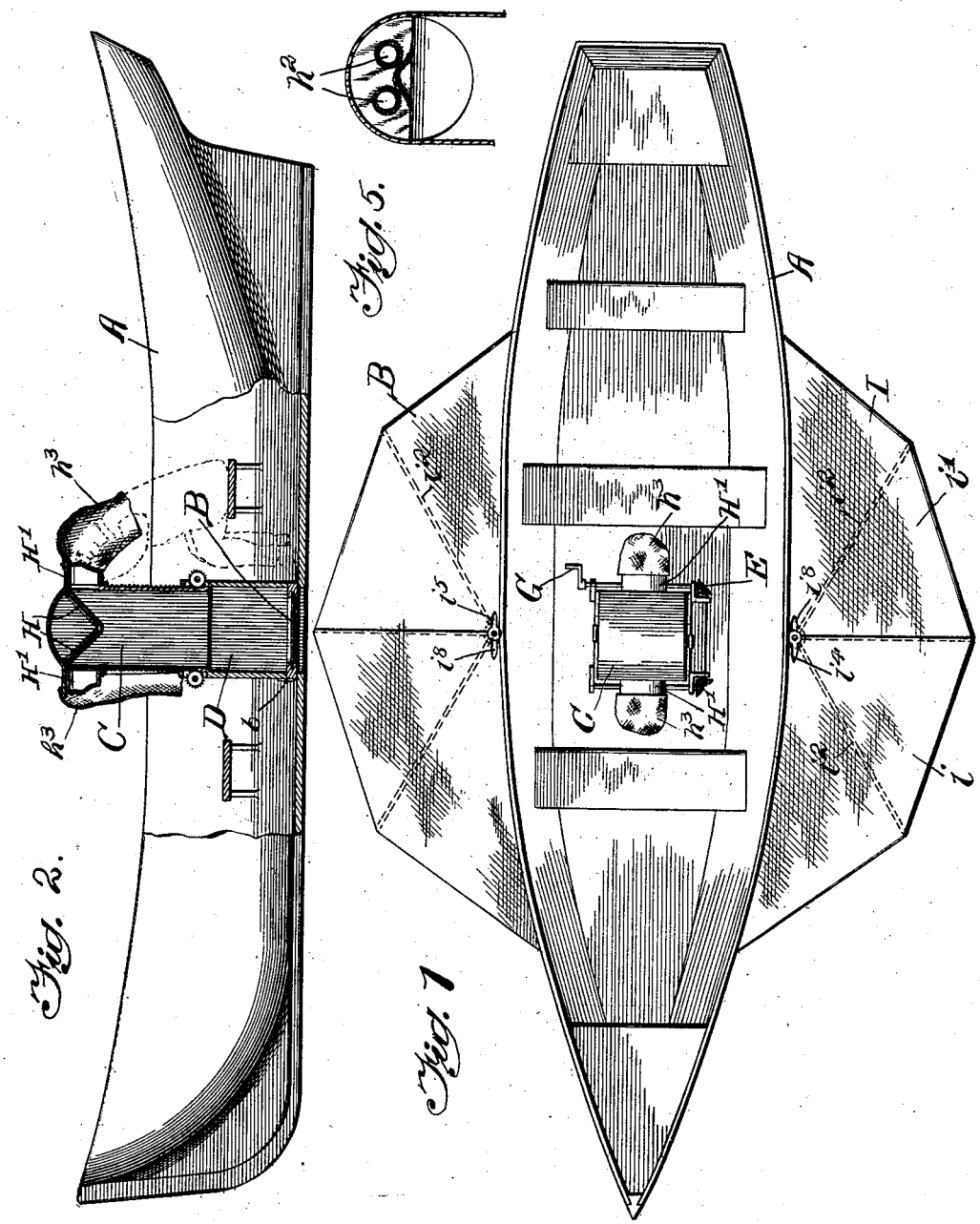
Witnesses:
JBWeir
Robert H. Weir
Inventor
Louis Larson
By Buckley & Durand
Attys.

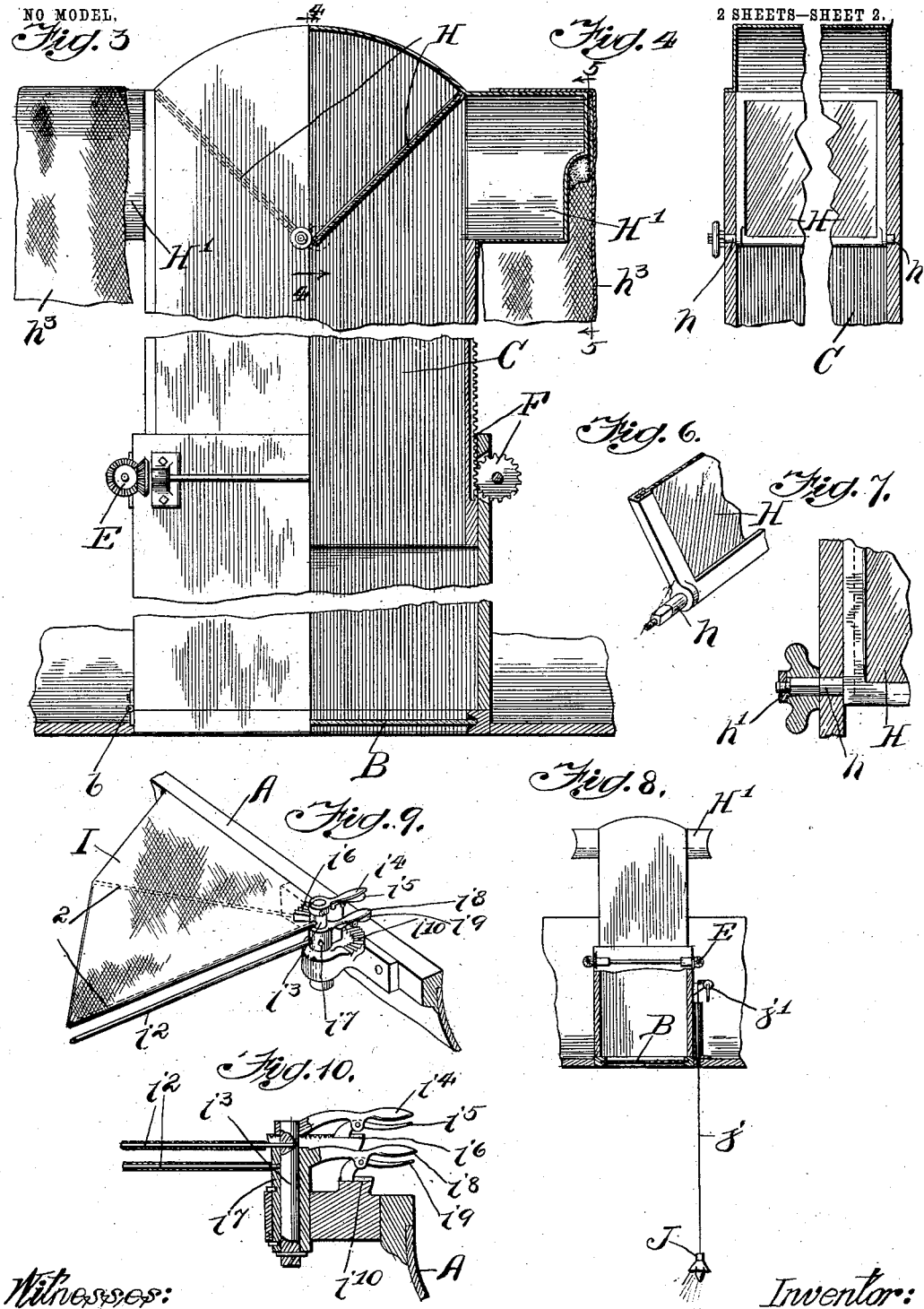

No. 756,244. Patented April 5, 1904.

UNITED STATES PATENT OFFICE.

LOUIS LARSON, OF MUSKEGON, MICHIGAN, ASSIGNOR OF ONE-HALF TO HENRY J. WOODS, OF MUSKEGON, MICHIGAN.

GLASS-BOTTOM BOAT.

SPECIFICATION forming part of Letters Patent No. 756,244, dated April 5, 1904.

Application filed May 18, 1903. Serial No. 157,611. (No model.)

*To all whom it may concern:*

Be it known that I, LOUIS LARSON, a citizen of the United States of America, and a resident of Muskegon, Muskegon county, Michigan, have invented a certain new and useful Improvement in Glass-Bottom Boats, of which the following is a specification.

In a glass-bottom boat characterized by my invention the glass or transparent plate in the bottom of the boat is preferably covered by an inclosure and one or more mirrors are arranged at the top of the inclosure in such manner that the bottom of a lake or river or other body of water may be seen and carefully examined by observing the reflection in any one of said mirrors. Thus instead of looking downward and directly through the glass bottom of the boat the observer is allowed to sit upright in the boat and look straight ahead into one of the reflecting-mirrors. Means are provided for raising and lowering the top of the inclosure, so as to position the mirrors at the right height, and further means are provided for preventing the breath of the observer from darkening the surface of the mirror into which he is looking. I also provide the boat with a pair of laterally-extending wings, which shade the water in the vicinity of the boat and which I find makes it possible to see to a greater depth in the water than without them. Preferably these wings are of such character as to be readily folded back against the side of the boat when not in use. I also provide an electric lamp which can be lowered into the water, so as to illuminate the immediate vicinity of the glass bottom. The nature and advantages of my invention will, however, hereinafter more fully appear.

In the accompanying drawings, Figure 1 is a plan of a glass-bottom boat embodying the features of my invention. Fig. 2 is a side elevation of the same, showing the central portion of the boat in vertical longitudinal section. Fig. 3 is an enlarged side elevation of the inclosure over the glass bottom, the right-hand half of said inclosure being shown in vertical section. Fig. 4 is a vertical section on line 4 4 in Fig. 3. Fig. 5 is a reduced section on line 5 5 in Fig. 3. Figs. 6 and 7 show details of the mirror construction; Fig. 8, an electric lamp suspended from the bottom of the boat. Figs. 9 and 10 show details of the two wings for shading the water at the sides of the boat.

The boat A can be of any suitable or desired construction. The glass bottom or transparent plate B is preferably located at the center of the boat. An inclosure consisting of the upper and lower portions C and D, the upper telescoped within the lower one, is preferably arranged over the said glass bottom or transparent plate. The two parts of the inclosure are adjustable relatively to each other, so as to raise and lower the upper part through the medium of the bevel-gearing E, the rack and pinion F, and the crank-handle G. With this arrangement the upper part of the inclosure may be raised and lowered at will. The top of the inclosure can be provided with oppositely-arranged mirrors H, mounted in such manner as to remain normally at an angle of about forty-five degrees. For example, these mirrors can be mounted in such manner as to swing about pivots $h$, and the adjustment of the mirrors at any desired point can be maintained by means of set-screws $h'$. With this arrangement the mirrors can be placed at any desired angle. The inclosure can be provided at each side with a cylindric extension H', having openings $h^2$ for the eyes. In this way the observer can look through the openings $h^2$ without danger of breathing upon the mirror. Each extension is preferably provided with a cloth hood $h^3$, which can be placed over the head for the purpose of excluding the light. The inclosure in its entirety can be hinged to the bottom of the boat at $b$, whereby it may be tilted over to afford access to the glass bottom.

In order to darken the water in the immediate vicinity of the boat as much as possible and to thereby make it possible to see to a greater depth, I provide the boat with laterally-extending wings I. Each wing preferably consists of two sections $i$ and $i'$, each one being of flexible cloth mounted on ribs or rods $i^2$. The ribs or rods of the section $i$ are mounted on a pivot $i^3$, which can be rotated by the handle $i^4$, provided with a dog $i^5$, adapted to engage the circular rack $i^6$. The ribs or rods of the other section are mounted on a rotary sleeve $i^7$, which latter is provided with a similar handle $i^8$, provided with a dog $i^9$, adapted to engage a circular rack $i^{10}$. With this arrangement the two sections of each wing can be folded back against the boat or they can be extended and stretched into place, as shown in Figs. 1 and 9. I find that these wings by excluding the sunlight from the water about the boat make it possible to see to a much greater depth than without them.

If desired, the electric lamp J (shown in Fig. 8) can be suspended from the bottom of the boat immediately below the glass bottom, so as to illuminate the water in the immediate vicinity. This incandescent lamp can have its circuit-wires $j$ extended upwardly through an opening in the boat and secured to a reel $j'$. This feature I find to be of great advantage in viewing the bottom of a lake or river which is somewhat dark or muddy in character.

Fig. 2 shows the manner in which my improved glass-bottom boat is used. The observer can sit upright in the boat and can see the bottom of the lake or river by simply looking straight ahead into one of the mirrors. As the light is excluded at all points, it is possible to see to a great depth.

What I claim as my invention is—

1. A boat having its bottom provided with a glass plate, an inclosure over said plate, and a mirror at the top of the inclosure.

2. A boat having its bottom provided with a glass plate, a vertically-extensible inclosure arranged over said plate, and a reflecting-mirror mounted in the top of said inclosure.

3. A boat having its bottom provided with a glass plate, an inclosure arranged over said plate, a reflecting-mirror in the top of the inclosure adapted to be arranged at an angle of substantially forty-five degrees, and a cloth hood adapted to cover the head of said observer while looking into said mirror.

4. A boat having its bottom provided with a glass plate, an inclosure arranged over said plate, a reflecting-mirror mounted in the top of said inclosure, said inclosure having an extension opposite said mirror, the extension being provided with a couple of openings for the eyes, and a flexible covering secured to said extension and adapted to exclude the light while looking through said openings.

5. A boat having its bottom provided with a glass plate, a vertically-extensible inclosure arranged over said plate, a crank and power-transmitting connections for raising and lowering the upper part of said inclosure, and a couple of reflecting-mirrors arranged in the top of said inclosure.

6. A boat having its sides provided with laterally-extending wings adapted to shade the water at each side of the boat, and having also an inclosure arranged over a glass plate in its bottom.

7. A boat having its sides provided with folding wings adapted when extended to shade the water at each side of the boat, and having also an inclosure arranged over a glass plate in its bottom.

8. A boat provided with an incandescent electric lamp adapted to be suspended in the water below the boat, and having also an inclosure arranged over a glass plate in its bottom.

9. A boat provided with inclosed and adjustable reflecting-mirrors, and having also an inclosure arranged over a glass plate in its bottom.

Signed by me at Chicago, Illinois, this 15th day of May, 1903.

LOUIS LARSON.

Witnesses:
CHARLES HICKOK,
WM. A. HARDERS.